Sept. 7, 1948.  A. MOTYCKA  2,448,820
PIPE TESTING APPARATUS
Filed March 11, 1946  2 Sheets-Sheet 1
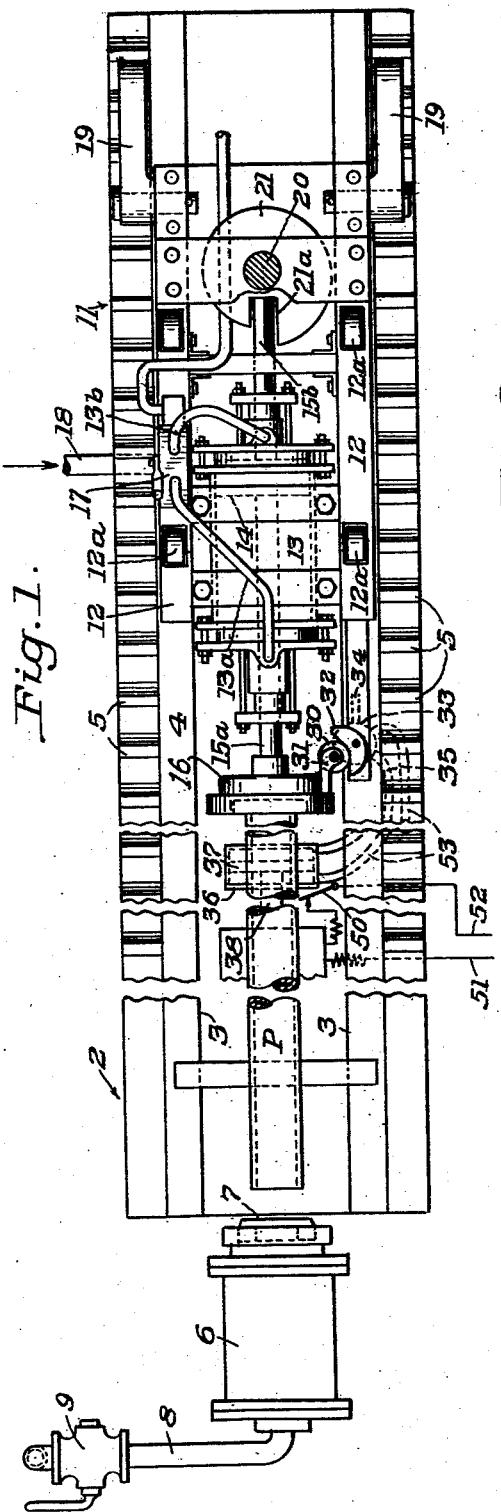
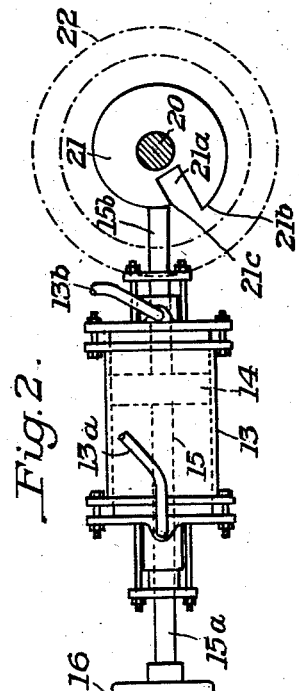
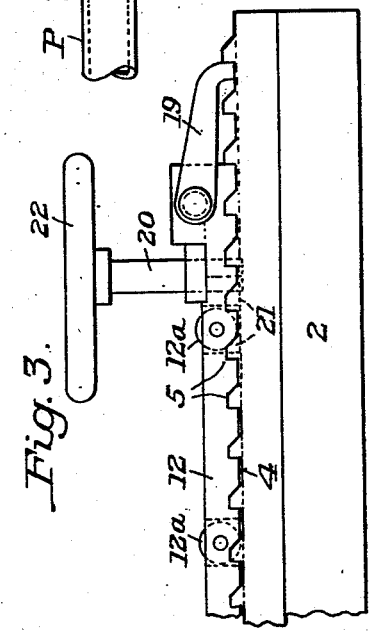
INVENTOR
*Arthur Motycka*
by Christy, Parmelee & Strickland
ATTORNEYS Sept. 7, 1948.　　　　A. MOTYCKA　　　　2,448,820
PIPE TESTING APPARATUS
Filed March 11, 1946　　　　　　　　　　2 Sheets-Sheet 2
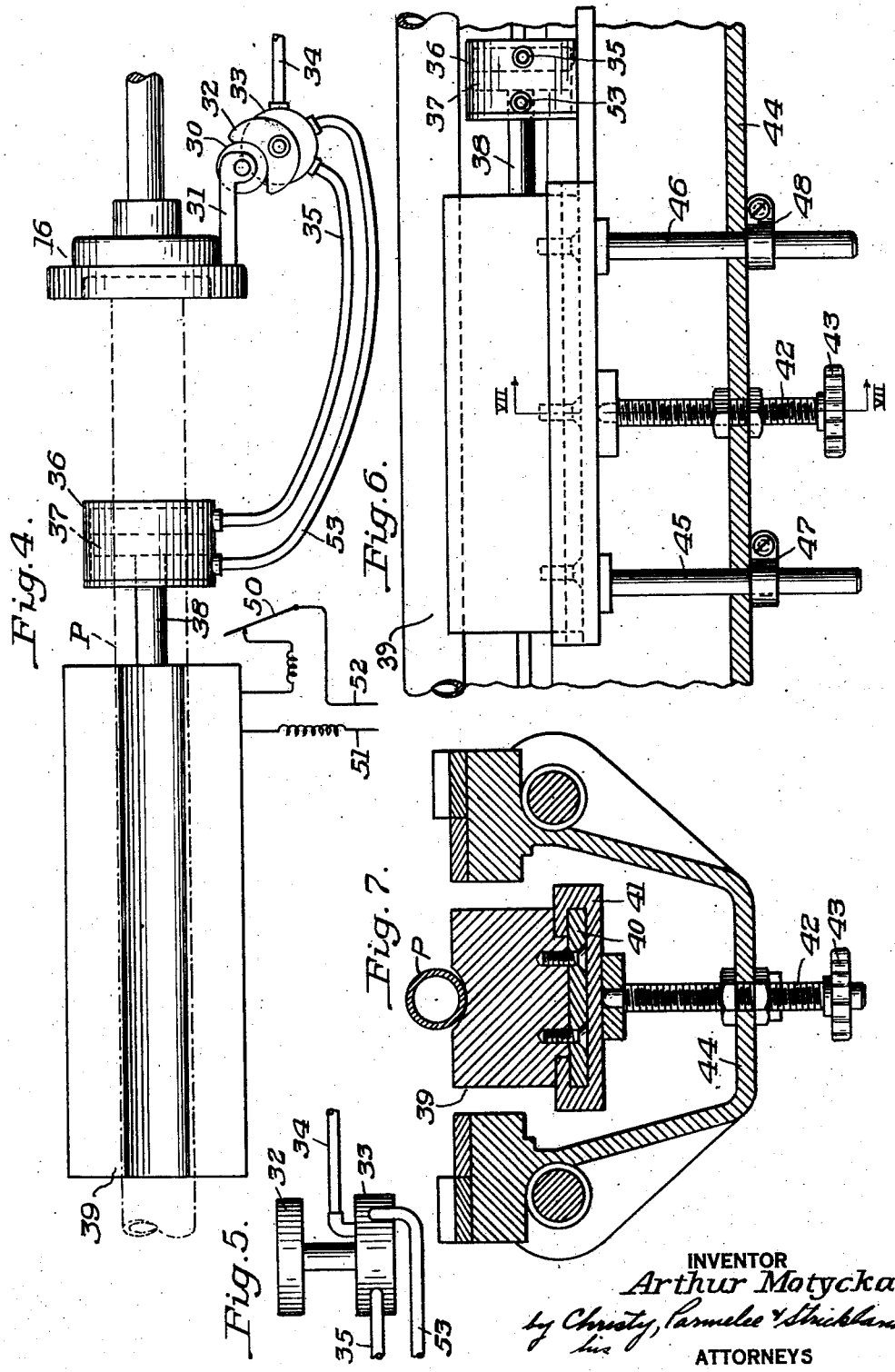
INVENTOR
*Arthur Motycka*
by Christy, Parmelee & Strickland
his ATTORNEYS Patented Sept. 7, 1948

2,448,820

UNITED STATES PATENT OFFICE 2,448,820

PIPE TESTING APPARATUS

Arthur Motycka, Beaver, Pa., assignor to Pittsburgh Tube Company, Monaca, Pa., a corporation of Delaware Application March 11, 1946, Serial No. 653,649

6 Claims. (Cl. 73—37)

This invention relates to the testing of pipes and tubes by the use of high pressure fluids, especially hydraulic testing, and is for an improved testing apparatus. The present application is a continuation-in-part of my co-pending application Serial No. 575,985, entitled "Pipe testing apparatus," filed February 3, 1945, now abandoned.

Testing apparatus, according to the present invention, generally comprises a test bench having a headstock carrying a high pressure supply fitting at one end thereof, the headstock being fixed. At the other end of the test bench is a tailstock which may be moved lengthwise of the bed or test-bench to accommodate pipes of different lengths. A pawl on the carriage constituting the tailstock support engages ratchet-like teeth along the bench to hold the tailstock against backward movement. The tailstock also carries a cylinder which operates a fitting for closing the end of the pipe at the tailstock end. In operation, a length of pipe is put between the fitting on the headstock, and the one on the tailstock with the tailstock adjusted to clear the end of the pipe, and then the cylinder is operated to shove the pipe against the fitting at the headstock or forward end of the apparatus and also close the pipe at its tailstock end. Liquid, usually water, is then introduced through the fitting or plug at the headstock end until the pipe is full, the liquid being of a high hydrostatic pressure. The plug at the tailstock end of the tube is thus also subject to the high pressure of the liquid in the pipe.

For the above reason, in common types of testing apparatus, sufficient pressure had to be applied by the cylinder that operates the fitting at the tailstock end to resist such pressure. The larger the diameter of the pipe being tested, the less effective is a given pressure in the cylinder to resist endwise movement of the tailstock plug, and various arrangements have been devised to compensate for this.

An object of my invention is to provide a test bench in which the arrangement just described may be employed with only low pressure in the tailstock cylinder, this cylinder being used merely to actuate the plug, while the counter-pressure to resist endwise movement is secured by a mechanical back-up device, preferably in the form of an eccentric cam, which, after operation of the cylinder to close the tube, is turned to bear forcibly against a protruding rear extension of the piston rod, thus locking, mechanically, the piston rod against reverse movement.

A further object of my invention is to provide a magnetic chuck means for automatically releasing the pipe from the fitting on the headstock after fluid testing.

My invention may be more fully understood by reference to the accompanying drawings, in which:

Figure 1 is a plan view of a test bench embodying the principles of my invention;

Figure 2 is a fragmentary plan view similar to Figure 1 but showing the cam in operating position;

Figure 3 is a fragmentary side elevation of a portion of the bench and tailstock;

Figure 4 is an enlarged partial view of the pneumatic and electrical system for controlling the movement of the pipe and including a magnetic chuck and a three-way pressure valve;

Figure 5 is a side view, somewhat enlarged, of the three-way valve embodied in Figure 4;

Figure 6 is a side view of the magnetic chuck shown in Figure 4, and

Figure 7 is a cross-sectional view taken along line VII—VII of Figure 6.

In the drawings, 2 designates generally a test bench having a bed comprised of two rails 3, these rails having smooth marginal track portions 4 along their inner edges and a series of ratchet-like teeth 5 along their outer edges. At one end, hereinafter sometimes designated the forward end of the bench, is a stand or headstock 6 which carries a fitting 7 in the form of a disc faced to seal against the end of a pipe to be tested. A pipe 8 controlled by a valve 9 admits testing fluid through the fitting 7. A piece of pipe P to be tested has one end supported against and closed by the fitting 7.

Movable along the bed of the test bench is a carriage, designated generally as 11, which has two side bars 12 provided with rollers 12a that ride on the portions 4 of the bed rails 3 to enable the carriage to be freely moved back and forth. This carriage carries a cylinder 13 in which is a piston 14, the piston 14 having a rod 15 which projects from both ends of the cylinder, the front end, 15a, having a fitting 16 thereon which is in axial alignment with and is similar to the fitting 7. There is a rearwardly protruding extension 15b on the piston rod.

At each end of the cylinder 13 is a pipe, these pipes being designated 13a, and 13b, communicating with a four-way valve 17 so that when fluid is admitted from a source 18 to one side of the piston, fluid may exhaust from the opposite side, as is well understood in the art.

On the carriage 11 are two pawls 19 which are adapted to ride over the teeth 5 when the carriage is moved forwardly, i. e., toward the headstock, but which prevent rearward movement of the carriage unless they are manually disengaged.

Also carried on the carriage 11 is a vertical shaft 20 having an eccentric cam disc 21 thereon. This shaft, carried in suitable bearings, has a hand wheel 22 at its upper end. The cam disc 21 has a spiral or involute periphery, with a notch 21a between the high point 21b and the low point 21c of the periphery. When the piston 14 is in its retracted or rearward position, the end 15b of piston rod 15 extends into the notch 21a, as shown in Figure 1, and the cam may not be rotated. When the piston is moved forwardly until rod end 15b clears the notch, the cam may be turned so that its periphery will bear against and back up the piston rod, as shown in Figure 2.

In operation, the carriage is adjusted to a position where a predetermined length of pipe P may be easily brought to position between fittings 7 and 16 without contacting either of these fittings, the pipe being rolled in from one side of the machine. Then valve 17 is operated to drive piston 14 forwardly to thrust the forward end of the pipe against fitting 7 and seal the other end of the pipe with fitting 16. As piston 14 is driven forwardly to clamp and seal the ends of the pipe, roller 30 which is rotatably mounted on arm 31 rigidly attached to fitting 16 is moved to the position shown in Figure 4, with respect to a crescent-shaped valve operating cam 32. This places the operating element of a three-way valve 33, of any well-known construction and illustrated more clearly in Figure 5, in such position with respect to the valve body so as to complete a fluid connection between supply pipe 34 and pipe 35. Suitable venting means (not shown) of any well-known construction are employed for venting opposite sides of cylinder 36 as actuating fluid pressure is applied thereto. For purposes of simplicity of illustration, such venting means are not shown. Hence fluid under pressure will be introduced in cylinder 36 in the space to the right of piston 37, as viewed in Figure 4, thus causing piston 37 and piston rod 38 to move to the left. A magnetic chuck 39, which embodies as electromagnet and which may be of any well-known construction, has attached to its main body or core portion, a base member 40 which is slidably mounted on track 41. It will be noted that both cylinder 36 and magnetic chuck 39 are supported by the same base structure that supports track 41 so that axial movement of piston rod 38 will cause sliding of magnetic chuck 39 on track 41.

Adjustable means are provided so as to adjustably raise or lower the magnetic chuck 39 to accommodate different diameters of pipe. More specifically, a screw-threaded stud 42 which is rotated by turning on knob 43 vertically adjusts the position of the magnetic clutch with respect to the support 44. Guide pins or sleeves 45 and 46 have their upper ends rigidly secured to the bottom of track 41 and their lower ends extending through clamps 47 and 48, respectively, which are rigidly secured or welded to the bottom of support 44. Before vertically adjusting the position of magnetic clutch 39, clamps 47 and 48 are loosed and after the adjustment is made, they are tightened again. Thus a rigid adjustable structure is provided.

As described above, when piston rod 38 moves to the forward position, that is, to the left, as viewed in Figure 4, it slides magnetic chuck 39 in the same direction along track 41. As the limit of this movement is reached, the chuck operates a suitable switch 50, such as a limit switch mounted on carriage 11, so as to close a circuit through the coils of the magnetic clutch. Line terminals 51 and 52 are energized by any suitable source of electrical energy so as to magnetize the magnetic chuck 39 and forcefully attract pipe P thereagainst since such pipe is of magnetic material and is attracted in the same way as an armature.

The pawls 19, engaging the racks 5, prevent the carriage from being thrust rearwardly. When the fitting 16 has moved into position to engage the pipe between the fittings, end 15b of piston rod 15 will clear notch 21a in cam 21. The hand wheel 22 is then turned until the spiral periphery of the cam firmly bears against the rear end 15b of the piston rod, to prevent any backward movement of the piston.

This being done, the pipe is filled with water or other fluid introduced through fitting 7, high pressure being supplied at the proper time. It will be seen that since there is a mechanically operated back-up or back-stop device bearing against piston rod 15, the fluid pressure in the pipe cannot force the piston 14 with its fitting 16 rearwardly, even though the pressure in cylinder 13 is only sufficient to operate the fitting 16 back and forth, and that the magnitude of the counter-pressure in cylinder 13 is of no importance, and the pipes of different diameters can be tested without complications of any sort.

When the test is completed, the pressure in the pipe P is relieved, the cam 21 is turned back to its original position, and valve 17 operated to withdraw the plug or fitting 16. The notch 21a in the cam allows adequate free travel of the piston under all conditions so that fitting 16 may be drawn entirely out of the path of a piece of pipe being rolled into place, while enabling the pitch of the cam itself to be very low so that the cam is not likely to be rotated by back thrust of the piston rod against it, and so that it may be easily turned to apply great pressure to the piston rod. It will also be noted that the shaft 20 for the cam is centered directly back of the piston so that the back thrust on the cam is radial to its center, which prevents the cam from rotating under the pressure of the back thrust.

The magnetic chuck means is provided for automatically releasing the pipe from the fitting on the headstock after the fluid testing operation has been completed. Since, as described previously, the pipe P is magnetically attracted to chuck 39, then it will be apparent that when valve 17 is operated so as to effect rearward movement of piston rod 15a, that is, to the right, as viewed in Figure 4, roller 30 will rotate cam 32 to a position so as to close communication between pipes 34 and 35 and complete a fluid path from pipe 34 to pipe 53 and thus cause rearward or movement to the right of piston rod 38 and of magnetic chuck 39 secured thereto. Since pipe P is held down firmly against chuck 39 by magnetic attraction, the pipe will be moved rearwardly so as to break the seal or bond between the end of the pipe and fitting 7. In the course of such movement, the chuck will effect opening of limit switch 50, thereby de-energizing its coil so as to prepare for the next operation in a forward direction. Thus it will be seen that an effective means is provided to detach the end of the pipe from fitting 7 against which it is otherwise stuck very tightly.

While I have illustrated and described a preferred embodiment of my invention, it will be understood that various changes and modifications may be made within the contemplation of my invention and under the scope of the following claims.

I claim:

1. In a pipe testing machine of the type having two fittings between which a length of pipe to be tested is supported, one of said fittings being mounted on a carriage which is movable toward and away from the other fitting, said carriage being provided with means including a cylinder fixed to the carriage and a piston in the cylinder for moving the fitting which is carried thereby, there being a piston rod between the piston and the fitting, the herein described invention which comprises providing said piston rod with a rearwardly extending projection, and a mechanical back-up means on the carriage movable into and out of engagement with the projecting end of the piston rod.

2. In a pipe testing machine of the type having two fittings between which a length of pipe to be tested is supported, one of said fittings being mounted on a carriage which is movable toward and away from the other fitting, said carriage being provided with means including a cylinder fixed to the carriage and a piston in the cylinder for moving the fitting which is carried thereby, there being a piston rod between the piston and the fitting, the herein described invention which comprises providing said piston rod with a rearwardly extending projection, and a mechanical back-up means on the carriage movable into and out of engagement with the projecting end of the piston rod, said means comprising a rotatable eccentric cam, the periphery of which is positioned to bear against the rearwardly projecting extension of the piston rod.

3. In a pipe testing machine of the type having two fittings between which a length of pipe to be tested is supported, one of said fittings being mounted on a carriage which is movable toward and away from the other fitting, said carriage being provided with means including a cylinder fixed to the carriage and a piston in the cylinder for moving the fitting which is carried thereby, there being a piston rod between the piston and the fitting, the herein described invention which comprises providing said piston rod with a rearwardly extending projection, and a mechanical back-up means on the carriage movable into and out of engagement with the projecting end of the piston rod, said means comprising a rotatable eccentric cam, the periphery of which is positioned to bear against the rearwardly projecting extension of the piston rod, the axis of rotation of the cam being in line with, but transverse to, the axis of the piston rod.

4. In a pipe testing machine of the type having two fittings between which a length of pipe to be tested is supported, one of said fittings being mounted on a carriage which is movable toward and away from the other fitting, said carriage being provided with means including a cylinder fixed to the carriage and a piston in the cylinder for moving the fitting which is carried thereby, there being a piston rod between the piston and the fitting, the herein described invention which comprises providing said piston rod with a rearwardly extending projection, and a mechanical back-up means on the carriage movable into and out of engagement with the projecting end of the piston rod, said means comprising a rotatable eccentric cam, the periphery of which is positioned to bear against the rearwardly projecting extension of the piston rod, said cam having a high point and a low point with a spiral periphery between the high point and the low point, the cam being provided with a notch intermediate the high and low points into which the projection on the piston rod may extend when the piston is in retracted position.

5. In a pipe testing machine of the type having two fittings between which a length of pipe to be tested is supported, one of said fittings being mounted on a carriage which is movable toward and away from the other fitting, said carriage being provided with means including a cylinder fixed to the carriage and a piston in the cylinder for moving the fitting which is carried thereby, there being a piston rod between the piston and the fitting, the herein described invention which comprises providing said piston rod with a rearwardly extending projection, and a mechanical back-up means on the carriage movable into and out of engagement with the projecting end of the piston rod, said means comprising a rotatable eccentric cam, the periphery of which is positioned to bear against the rearwardly projecting extension of the piston rod, said cam having a high point and a low point with a spiral periphery between the high point and the low point, the cam being provided with a notch intermediate the high and low points into which the projection on the piston rod may extend when the piston is in retracted position, and a hand wheel for rotating the cam.

6. A pipe testing machine having two fittings between which a pipe to be tested is supported and sealed, a carriage on which one of said fittings is carried, fluid operated means including a multiple valve for selectively moving the last mentioned fitting axially toward or away from the other, and back-up means mounted on the carriage independently of said fluid operated means for supporting the said fitting on the carriage against backward movement after it has been advanced a predetermined distance toward the other fitting.

ARTHUR MOTYCKA.

REFERENCES CITED

The following references are of record in the file of this patent:

UNITED STATES PATENTS

| Number | Name | Date |
|---|---|---|
| 131,405 | McGowan | Sept. 17, 1872 |
| 1,994,675 | Weckerly | Mar. 19, 1935 |
| 2,196,317 | Longstreet | Apr. 9, 1940 |
| 2,293,471 | Protin | Aug. 18, 1942 |

FOREIGN PATENTS

| Number | Country | Date |
|---|---|---|
| 440,669 | Germany | May 21, 1925 |